(12) United States Patent
Kuroda

(10) Patent No.: US 9,969,238 B2
(45) Date of Patent: May 15, 2018

(54) HOLLOW STABILIZER

(71) Applicant: NHK SPRING CO., LTD., Yokohama, Kanagawa (JP)

(72) Inventor: Shigeru Kuroda, Kanagawa (JP)

(73) Assignee: NHK SPRING CO., LTD, Yokohama, Kanagawa (JP)

( * ) Notice: Subject to any disclaimer, the term of this patent is extended or adjusted under 35 U.S.C. 154(b) by 0 days. days.

(21) Appl. No.: 15/305,837

(22) PCT Filed: Apr. 20, 2015

(86) PCT No.: PCT/JP2015/061964
§ 371 (c)(1),
(2) Date: Oct. 21, 2016

(87) PCT Pub. No.: WO2015/163275
PCT Pub. Date: Oct. 29, 2015

(65) Prior Publication Data
US 2017/0043642 A1    Feb. 16, 2017

(30) Foreign Application Priority Data

Apr. 24, 2014 (JP) .................. 2014-089923

(51) Int. Cl.
*B60G 21/055* (2006.01)
*B21D 53/88* (2006.01)

(52) U.S. Cl.
CPC ........... *B60G 21/055* (2013.01); *B21D 53/88* (2013.01); *B60G 2202/135* (2013.01);
(Continued)

(58) Field of Classification Search
CPC ......... B60G 21/055; B60G 2206/8402; B60G 2206/8103; B60G 2206/724; B60G 2202/135; B60G 2206/427; B21D 53/88
See application file for complete search history.

(56) References Cited

U.S. PATENT DOCUMENTS 4,378,122 A * 3/1983 Ohno .................. B60G 21/055
138/109
4,429,899 A * 2/1984 Ohno .................. B60G 21/055
138/109
(Continued)

FOREIGN PATENT DOCUMENTS

GB    2058689 A    4/1981
JP    57-134520 A    8/1982
(Continued)

OTHER PUBLICATIONS

International Search Report, PCT/JP2015/061964, dated Jul. 7, 2015, 2 pgs.
(Continued)

*Primary Examiner* — Darlene P Condra
(74) *Attorney, Agent, or Firm* — Volpe and Koenig, P.C.

(57) ABSTRACT

A hollow stabilizer (1) according to the invention is formed in a hollow shape and includes a bent portion (1*c*1, 1*c*2, m1-m5). With a thickness of an inner side of the bent portion (1*c*1, 1*c*2, m1-m5) being larger than a thickness of an outer side of the bent portion (1*c*1, 1*c*2, m1-m5), a hardness of the outer side of the bent portion (1*c*1, 1*c*2, m1-m5) is higher than a hardness of the inner side of the bent portion (1*c*1, 1*c*2, m1-m5) through quenching by cooling down after heating by electrical heating.

3 Claims, 6 Drawing Sheets

(52) U.S. Cl.
CPC .. *B60G 2206/427* (2013.01); *B60G 2206/724* (2013.01); *B60G 2206/8103* (2013.01); *B60G 2206/8402* (2013.01)

(56) References Cited

U.S. PATENT DOCUMENTS

| | | | | |
|---|---|---|---|---|
| 4,854,150 | A * | 8/1989 | Brown | B21D 53/88 |
| | | | | 72/306 |
| 5,339,868 | A * | 8/1994 | Naoi | F16L 43/001 |
| | | | | 138/172 |
| 6,206,392 | B1 * | 3/2001 | Siecinski | B21C 37/16 |
| | | | | 138/121 |
| 6,318,710 | B1 * | 11/2001 | Anderson | B60G 21/055 |
| | | | | 267/154 |
| 6,682,610 | B1 * | 1/2004 | Inoue | B21C 37/06 |
| | | | | 148/519 |
| 7,591,453 | B2 * | 9/2009 | Sundgren | B60G 21/055 |
| | | | | 267/154 |
| 7,984,918 | B2 * | 7/2011 | Jung | B60G 21/055 |
| | | | | 280/124.106 |
| 8,668,212 | B2 * | 3/2014 | Renner | B60G 21/055 |
| | | | | 156/245 |
| 2013/0093153 | A1 * | 4/2013 | Ito | B60G 21/055 |
| | | | | 280/124.107 |
| 2015/0176101 | A1 * | 6/2015 | Ishitsuka | B21C 37/08 |
| | | | | 148/504 |
| 2016/0008862 | A1 * | 1/2016 | Jung | B21C 1/24 |
| | | | | 72/342.94 |
| 2017/0066299 | A1 * | 3/2017 | Mucher | B60G 21/0551 |

FOREIGN PATENT DOCUMENTS

| | | | |
|---|---|---|---|
| JP | 58-188531 | A | 11/1983 |
| JP | 60076232 | A * | 4/1985 |
| JP | 01-111848 | A | 4/1989 |
| JP | 2005-076047 | A | 3/2005 |
| JP | 2011-168101 | A | 9/2011 |
| JP | 2011-189892 | A | 9/2011 |
| JP | 2014-001417 | A | 1/2014 |
| JP | 2014-043922 | A | 3/2014 |

OTHER PUBLICATIONS

Extended European Search Report, European Patent Application No. 15783199.1, dated Dec. 12, 2017, 8 pgs.

* cited by examiner

HOLLOW STABILIZER

TECHNICAL FIELD

The present invention relates to a hollow stabilizer having a hollow shape and functioning to reduce a displacement between right and left wheels of a vehicle or the like.

BACKGROUND ART

A stabilizer for a vehicle needs to be disposed to extend in the right and left vehicle width direction while avoiding contact with auxiliary machinery, suspension parts, and so forth. For this reason, the stabilizer has a number of bending points to avoid contact with the other parts.

In a hollow stabilizer using a pipe (material), the material gathers (contracts) on the bend inner side of a bending point, and expands (extends) on the bend outer side of the bending point. Thus, the hollow stabilizer has been known to have a larger thickness on the bend inner side of the bending point and a smaller thickness on the bend outer side of the bending point than that of the material pipe before bending.

In addition, in the case where heat treatment of the stabilizer employs furnace heating of the entire part as heating for quenching, the inner side and the outer side of a bending point are heated to the same temperature. As a result, the difference in strength attributed to the difference in thickness remains as it is before the heat treatment.

CITATION LIST

Patent Literature

Patent Literature 1: Japanese Patent Application Publication No. 2011-168101

SUMMARY OF INVENTION

Technical Problem

Meanwhile, in order to achieve further weight reduction compared to the above-described hollow stabilizer with a uniform diameter and a uniform thickness, there is a hollow stabilizer with a varied thickness (See Patent Literature 1).

This stabilizer is intended to optimize the stress throughout the stabilizer as much as possible.

However, since the thicknesses of the bend outer side and the bend inner side of a bending point, which is bent with a bender, are different, the stress at the bend inner side of the bent portion still has a margin to an allowable design stress when the bend outer side of the bent point is designed at the allowable design stress. Accordingly, the stabilizer should have an extra weight for that margin in the present situation. In other words, it is common practice to set the outer diameter and the thickness to meet the maximum load stress because the fatigue limit (fatigue strength) reduces as the thickness of the pipe becomes smaller.

In light of the circumstances described above, an object of the present invention is to provide the lightest hollow stabilizer by optimizing the allowable stress and the durability at each portion thereof.

Solution to Problem

To attain the above object, a first aspect of the present invention provides a hollow stabilizer formed in a hollow shape and including a bent portion, in which with a thickness of an inner side of the bent portion being larger than a thickness of an outer side of the bent portion, a hardness of the outer side of the bent portion is made higher than a hardness of the inner side of the bent portion through quenching by cooling down after heating by electrical heating.

According to the first aspect of the present invention, since the hardness of the outer side of the bent portion is made higher than the hardness of the inner side of the bent portion by using electrical heating for quenching, the fatigue limit and the allowable stress of both sides is made closer to the same values, even though the thickness of the outer side of the bent portion is smaller than the thickness of the inner side of the bent portion.

The second aspect of the present invention provides a hollow stabilizer formed in a hollow shape and including a bent portion, in which durability of an inner side of the bent portion is made almost equal to durability of an outer side of the bent portion, through quenching by cooling down after heating by electrical heating.

According to the second aspect of the present invention, since the durability of the outer side of the bent portion and the durability of the inner side of the bent portion are made almost equal to each other by using electrical heating for quenching, it is possible to obtain the hollow stabilizer that does not have an extra material.

The third aspect of the present invention provides a hollow stabilizer formed in a hollow shape and including a bent portion, in which an allowable stress of an inner side of the bent portion is made almost equal to an allowable stress of an outer side of the bent portion, through quenching by cooling down after heating by electrical heating.

According to the third aspect of the present invention, since the allowable stress of the outer side of the bent portion and the allowable stress of the inner side of the bent portion are made almost equal to each other by using electrical heating for quenching, it is possible to obtain the hollow stabilizer that does not have an extra material.

The fourth aspect of the present invention provides the hollow stabilizer according to the first aspect of the invention, in which a range of a durability of an entire region of the hollow stabilizer is made equal to a desired range such that a weight of the hollow stabilizer is lightest.

According to the fourth aspect of the present invention, it is possible to achieve the lightest hollow stabilizer.

The fifth aspect of the present invention provides the hollow stabilizer according to the first aspect of the invention, in which outer diameters and the thicknesses throughout the hollow stabilizer are set such that stress of an entire area of the hollow stabilizer is within a range of allowable stresses and a weight of the hollow stabilizer is lightest.

According to the fifth aspect of the present invention, it is possible to achieve the lightest hollow stabilizer.

Advantageous Effects of Invention

According to the present invention, the lightest hollow stabilizer can be achieved by optimizing the allowable stress and the durability throughout the stabilizer.

BRIEF DESCRIPTION OF DRAWINGS

FIG. 5 is a partial cross-sectional view of one end portion of a material pipe that the stabilizer is formed of.

DESCRIPTION OF EMBODIMENTS

Hereinafter, an embodiment of the present invention is described with reference to the drawings.

Figure 1:
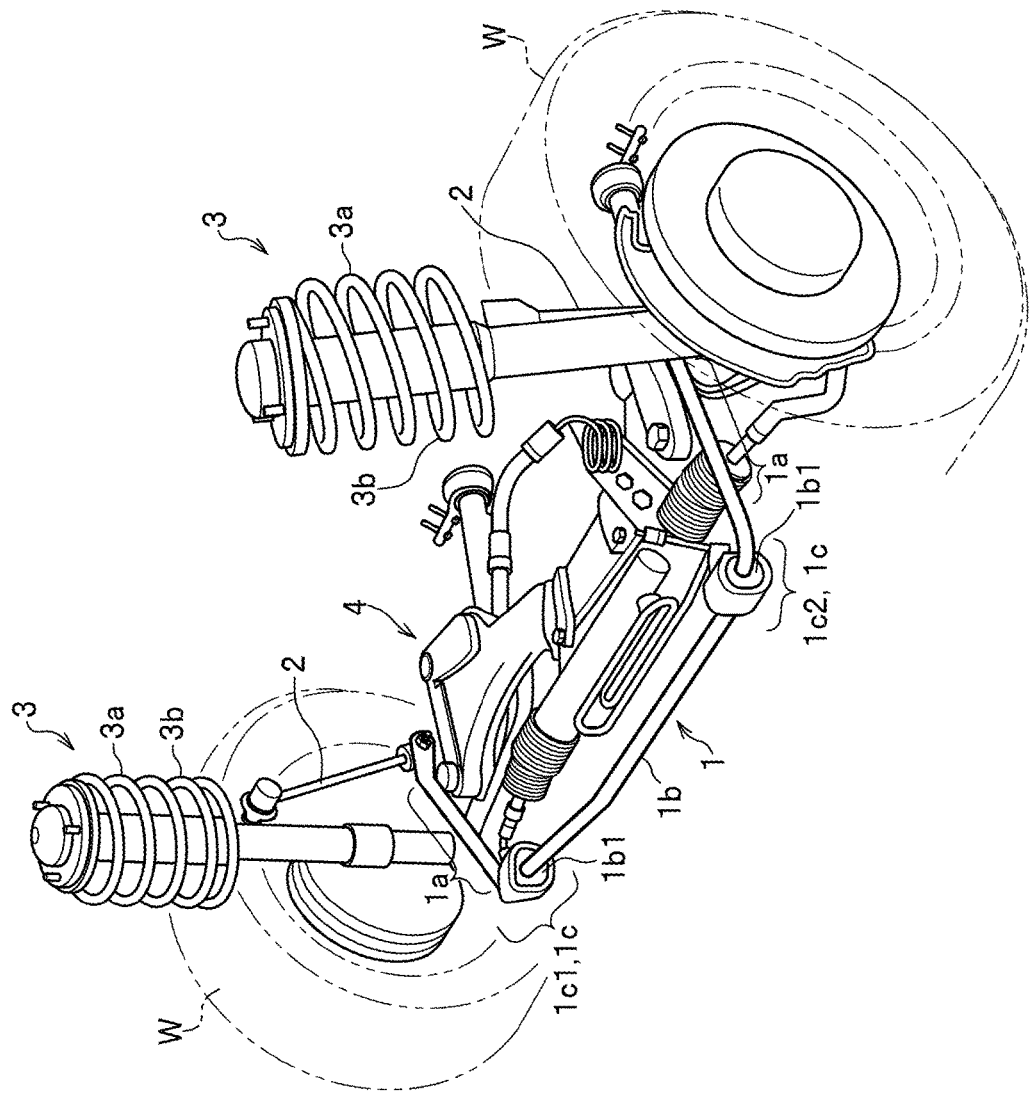
FIG. 1 is a perspective view illustrating a stabilizer of an embodiment connected to suspension apparatus of a vehicle according to the present invention.

FIG. 1 is a perspective view illustrating a hollow stabilizer of the embodiment connected to suspension apparatus of a vehicle according to the present invention.

Right and left wheels W used for traveling of a vehicle (not illustrated) are mounted on a vehicle body (not illustrated) with intervening suspension apparatuses 3. Each suspension apparatus 3 includes a coil spring 3a and a shock absorber 3b. The shock absorber 3b rotatably supports the wheel W and absorbs and cushions shocks applied from the wheel W in cooperation with the coil spring 3a.

The shock absorber 3b is mounted on the vehicle body with the intervening coil spring 3a. The displacement of the wheel W is attenuated under the viscous damping force of the shock absorber 3b and the elastic force of the coil spring 3a, which serve as the suspension apparatus 3, and this reduces the vibration of the vehicle body.

A stabilizer 1 is connected between the suspension apparatuses 3 mounted to the right and left wheels W. The stabilizer 1 serves as a torsion bar, which improves the roll stiffness of the vehicle body to reduce the rolling of the vehicle. Note that the roll stiffness means the stiffness against a torsion caused by rolling of the vehicle body, the rolling being caused by a positional displacement between the right and left wheels W.

The stabilizer 1 connects the shock absorbers 3b of the two suspension apparatuses 3, 3 that support the right and left wheels W opposed to each other. The stabilizer 1 extends between one shock absorber 3b and the other shock absorber 3b. In other words, the stabilizer 1 is disposed along the direction of the right and left wheels W, W.

Figure 2A:
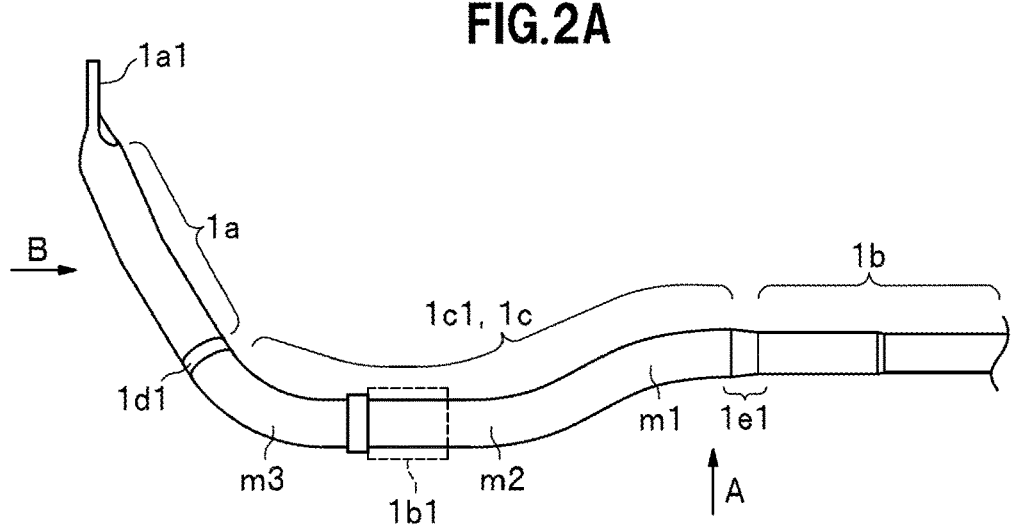
FIG. 2A is a top view illustrating one side of the stabilizer.
Figure 2B:
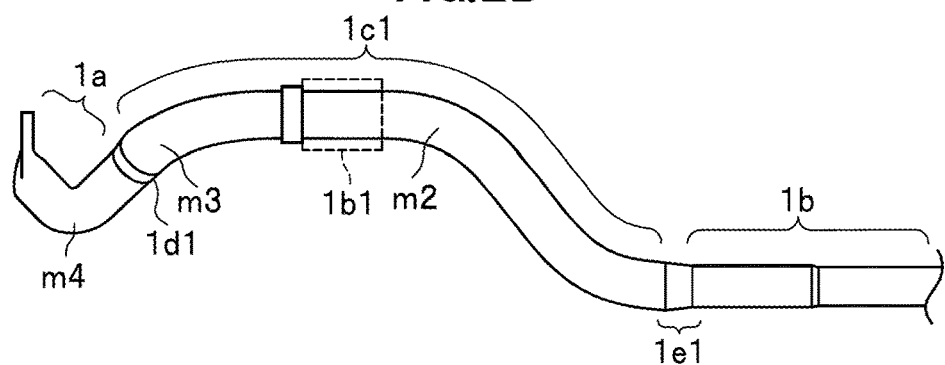
FIG. 2B is a view on arrow A in FIG. 2A.
Figure 2C:
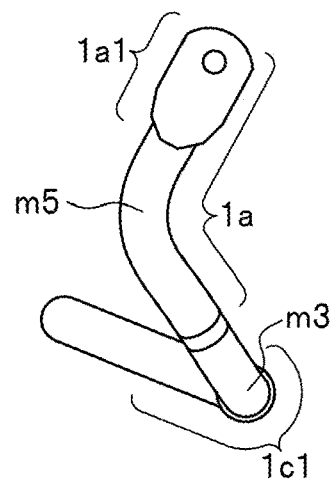
FIG. 2C is a view on arrow B in FIG. 2A.

FIG. 2A is a top view illustrating one side of the stabilizer, FIG. 2B is a view on arrow A in FIG. 2A, and FIG. 2C is a view on arrow B in FIG. 2A.

The stabilizer 1 is a member formed symmetrically. Although FIGS. 2A, 2B and 2C illustrate one side of the stabilizer 1, the other side has the same structure as that of the one side. So, descriptions are provided for the one side of the structure of the stabilizer 1, and descriptions for the structure of the other side of the hollow stabilizer 1 are omitted.

The hollow stabilizer 1 is formed using a material pipe 1A (see FIG. 5) which is a hollow pipe.

The hollow stabilizer 1 includes arm portions 1a formed at both the ends, a torsion bar portion 1b at the center, and curved portions 1c each between the arm portion 1a and the torsion bar portion 1b.

The outer diameter, the inner diameter, and the thickness of the curved portions 1c (1c1, 1c2) are formed larger than those of the arm portions 1a and the torsion bar portion 1b. Between the arm portion 1a and the curved portion 1c1, a diameter increasing portion 1d1 is formed where the outer diameter, the inner diameter and the thickness gradually increase from the arm portion 1a to the curved portion 1c1. In the same manner, between the torsion bar portion 1b at the center and the curved portion 1c, a diameter increasing portion 1e1 is formed where the inner diameter, the outer diameter, and the thickness gradually increase from the torsion bar portion 1b to the curved portion 1c. In short, the hollow stabilizer 1 is a member in which the area of the cross section intersecting the axis varies.

In the cases such as when the vehicle turns, the difference in the displacement between the two right and left shock absorbers 3b, 3b twists the torsion bar portion 1b at the center of the hollow stabilizer 1 via the arm portions 1a located at the ends. As a result, the elastic force of the hollow stabilizer 1 to restore the torsional deformation causes the rolling of the vehicle to be reduced.

The connecting portion 1a1 of the leading end of the arm portion 1a of the hollow stabilizer 1 is fixed and connected to the shock absorber 3b with the intervening link arm member 2.

The hollow stabilizer is equipped with rubber bushes 1b1, 1b1 at the curved portions 1c1, 1c2. The hollow stabilizer 1 is attached to the vehicle body with the intervening rubber bushes 1b1, 1b1, and the like.

As illustrated in FIG. 1, the hollow stabilizer 1 is disposed to extend in the right and left vehicle width direction while avoiding contact with auxiliary machinery 4, the suspension apparatus 3, and the like.

For this reason, as illustrated in FIGS. 2A, 2B and 2C, the hollow stabilizer 1 has a number of bending points m1 to m5 to avoid contact with other parts.

<Quenching Hollow Stabilizer 1>

Hereinafter, descriptions are provided for the framework to make the durability and the allowable stress the same throughout the hollow stabilizer 1 with varied thickness according to the embodiment.

Meanwhile, after the material pipe for the hollow stabilizer 1 is bent, the bent material pipe for the hollow stabilizer 1 needs to be heated for quenching.

There are heating methods such as furnace heating and electrical heating, and after heating, rapid cooling is performed using water. The hollow stabilizer 1 made of a spring steel pipe is transformed from a ferrite structure to an austenitic structure by heating, and then transformed from the austenitic structure to a martensite structure by rapid cooling for quenching.

<Quenching Hollow Stabilizer of Comparative Example by Furnace Heating>

As described earlier, if a hollow stabilizer of a comparative example, in which the designed stress at the bend inner side 1c1a of a bent portion is increased to the allowable stress, is equally heated by furnace heating for quenching, the stress at the bend outer side of the bent portion exceeds the allowable stress for design because the thickness of the bend outer side $1c1b$ of the bent portion is smaller.

Specifically, since the furnace heating heats the entire hollow stabilizer, the bend outer side and the bend inner side are heated to the same temperature, and the hollow stabilizer is quenched by water quenching or the like. The strength of the bend outer side and the bend inner side of the bent portion after quenching are naturally at the same level because both portions are heated to the same temperature. In other words, the allowable stresses for the bend outer side and the bend inner side of the bent portion are the same regardless of the difference in thickness. Therefore, if the stress generated at the bend inner side of the bent portion is designed based on the allowable stress, the stress generated at the bend outer side of the bent portion exceeds that of the bend inner side and deviates from the allowable stress.

<Electrical Heating of Hollow Stabilizer 1 for Quenching>

For this reason, the hollow stabilizer 1 according to the embodiment is heated by electrical heating.

In the case of electrical heating, at a bent portion (such as the curved portion $1c$), the temperature of the bend outer side $1c1b$ of the bent portion having a smaller thickness is higher than the temperature of the bend inner side $1c1a$ of the bent portion having a larger thickness.

The electric resistance (hereinafter referred to as the resistance R) is in proportion to the length L and in inverse proportion to the sectional area S. The relation is expressed as follows.

$$R \propto L/S \quad (1)$$

Therefore, when the thickness is smaller (the sectional area S is smaller), the resistance R is higher. Assuming that the current I is the same, the calorific value Q per unit time (1 second) is expressed as follows:

$$\text{Calorific value } Q = R \times I^2 \quad (2)$$

and the heating temperature becomes higher.

Thus, the relation is expressed as follows.

The temperature of the bend outer side of a bent portion having a smaller thickness>The temperature of the bend inner side of the bent portion having a larger thickness (3)

When the hollow stabilizer 1 in this state is rapidly cooled down, for example, by water quenching, the bend outer side and the bend inner side of the bent portion are cooled down in the same time period. The cooling speed (° C./min) of the temperature at the bend outer side of the bent portion having a smaller thickness is higher than the cooling speed of the temperature at the bend inner side of the bent portion from the equations (1), (2), and (3).

Figure 3:
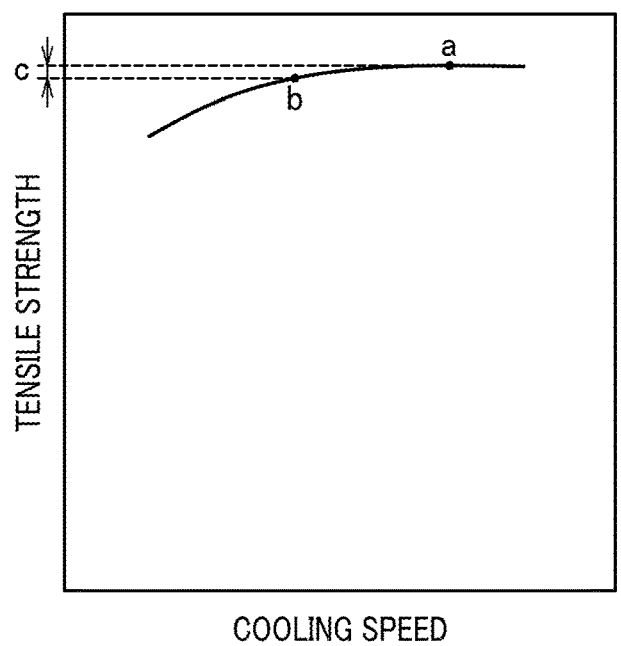
FIG. 3 is a diagram illustrating the relation between the cooling speed when quenching and the tensile strength.

The cooling speed and the tensile strength of the material have a relationship therebetween illustrated in FIG. 3. FIG. 3 is a diagram illustrating the relation between the cooling speed when quenching and the tensile strength. In FIG. 3, the horizontal axis represents the cooling speed of the material, and the vertical axis represents the tensile strength of the material.

From FIG. 3, it is understood that the bend outer side of the bent portion having a smaller thickness in which the cooling speed is higher because the temperature is higher will have higher tensile strength than the bend inner side of the bent portion having a larger thickness in which the cooling speed is lower because the temperature is lower.

In addition, a portion heated to a higher temperature when quenching, will have a higher strength and a higher hardness. In other words, in the case where electrical heating is used for quenching, the bend outer side of the bent portion having a smaller thickness will have higher tensile strength and higher hardness because the temperature at the bend outer side of the bent portion having a smaller thickness is higher than the temperature at the bend inner side of the bent portion having a larger thickness.

Figure 4:
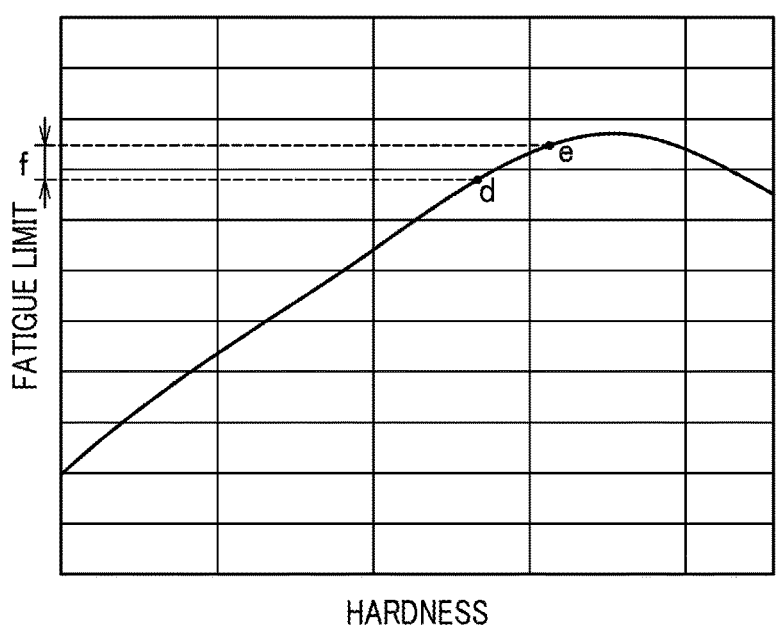
FIG. 4 is a diagram illustrating the relation between the hardness and the fatigue limit of the material.

FIG. 4 is a diagram illustrating the relation between the hardness and the fatigue limit of the material. In FIG. 4, the horizontal axis represents the hardness, and the vertical axis represents the fatigue limit.

According to FIG. 4, as the hardness becomes higher, the fatigue limit becomes higher. Note that the fatigue limit means the maximum repeated stress that does not break the material.

The present hollow stabilizer 1 is characterized in that a smaller thickness is aimed by utilizing the nature that the portion heated to a higher temperature in electrical heating will have higher tensile strength and a higher fatigue limit.

<Manufacturing Hollow Stabilizer 1>

Next, an overview of manufacturing the hollow stabilizer 1 is described.

<Material Pipe 1A of Hollow Stabilizer 1>

Figure 5:
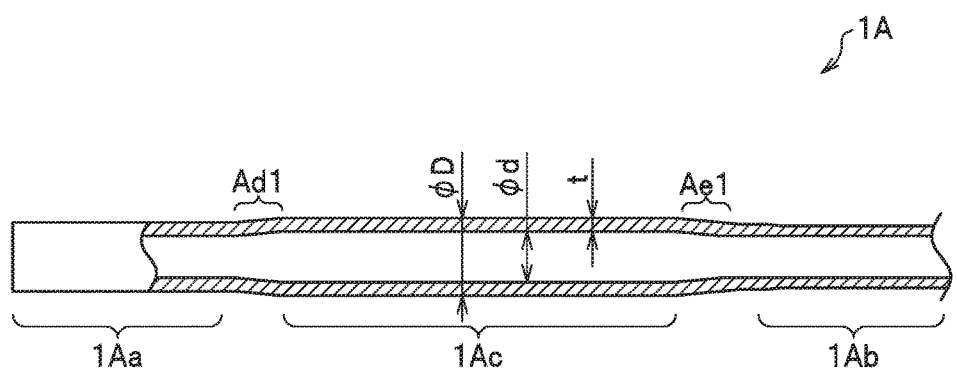

FIG. 5 is a partial cross-sectional view of one end portion of a material pipe that the stabilizer is formed of.

At a material stage before the bending process, the material pipe is processed so as to have outer diameters ΦD, inner diameters Φd, and thicknesses t that make the durability and the allowable stress (tensile strength) the same at each portion in the final form of the hollow stabilizer 1, by changing the sectional area of the pipe using processing methods such as swaging, butting, bulging, drawing, and cutting. In other words, the outer diameter ΦD, the inner diameter Φd, and the thickness t are changed and set depending on (to endure) the levels of the bending moment and the maximum principal stress related to the fatigue strength (fatigue limit) and the allowable stress (tensile strength).

As will be described later, because a torsion bar part 1Ab of the material pipe 1A for the hollow stabilizer 1, which is to be the torsion bar portion $1b$, receives only torsion, the thickness t is set thin, and the outer diameter ΦD and the inner diameter Φd are set small.

On the other hand, as to an arm part 1Aa of the material pipe 1A for the hollow stabilizer 1, which is to be the arm portion $1a$, the bending moment and the maximum principal stress are minimum (see FIGS. 10A, 10B, and 10C) at the connecting portion $1a1$ (see FIGS. 2A, 2B and 2C) of the leading edge of the arm portion $1a$, and the bending moment and the maximum principal stress gradually increase toward the center portion of the hollow stabilizer 1. However, because the absolute values of the bending moment and the maximum principal stress are not as large as those at the curved portion $1c$, the thickness t is set to be smaller than that of the curved portion $1c1$, and the outer diameter ΦD and the inner diameter Φd are set to be smaller than those of the curved portion $1c1$.

Figure 10A:
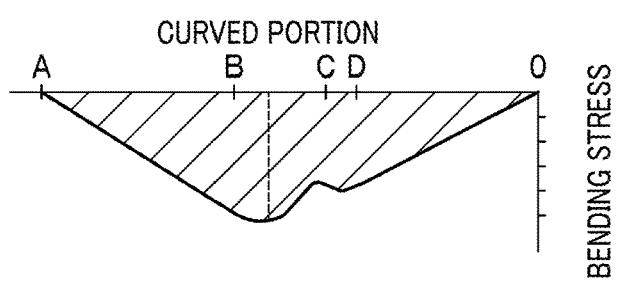
FIGS. 10A, 10B, and 10C are diagrams illustrating the bending stress, the shearing stress caused by torsion, and the maximum principal stress of the hollow stabilizer in FIG. 9, respectively.
Figure 10B:
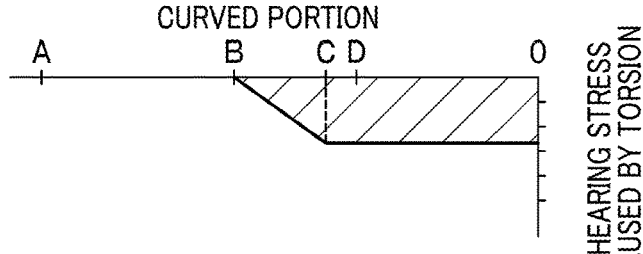
Figure 10C:
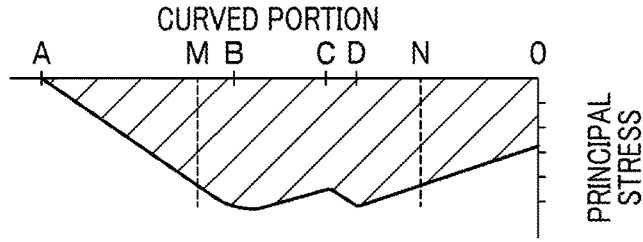

In contrast, because a curve part 1Ac of the material pipe 1A, which is to be the curved portion $1c1$ connecting the arm portion $1a$ and the torsion bar portion $1b$ of the hollow stabilizer 1, has the largest distance from the connecting portion $1a1$ of the arm portion $1a$ of the hollow stabilizer 1 where an outer force is applied, each of the bending moment and the maximum principal stress increases and shows the maximum value (see FIGS. 10A, 10B, and 10C).

Accordingly, the outer diameter ΦD and the inner diameter Φd are set larger, and the thickness t is set larger at the curve part 1Ac of the material pipe 1A formed into the curved portion 1c1 where the bending moment and the maximum principal stress are to be at their maximum.

Between the arm part 1Aa and the curve part 1Ac of the material pipe 1A, a diameter increasing part Ad1 to be the diameter increasing portion 1d1 of the hollow stabilizer 1 is formed, where the outer diameter ΦD, the inner diameter Φd and the thickness t gradually increase from the arm part 1Aa. In the same manner, between the torsion bar part 1Ab and the curve part 1Ac, a diameter increasing part Ae1 to be the diameter increasing portion 1e1 of the hollow stabilizer 1 is formed, where the outer diameter ΦD, the inner diameter Φd and the thickness t gradually increase from the torsion bar part 1Ab.

<Bending Process>

Next, the material pipe 1A illustrated in FIG. 5 is subjected to bending processes at a bender and formed into the hollow stabilizer 1 (see FIGS. 1, 2A, 2B and 2C).

As described earlier, because the material contracts at the bend inner sides of the bent portions while the material expands at the bend outer sides of the bent portions at the curved portion 1c and the bent portions m1 to m5 (see FIGS. 2A, 2B and 2C) of the hollow stabilizer 1, the bend inner side and the bend outer side of the bent portion are different in thickness. The relation in thickness is expressed as follows.

The bend inner side of the bent portion>The bend outer side of the bent portion (4)

<Quenching>

Next, quenching is performed using electrical heating.

Figure 6:
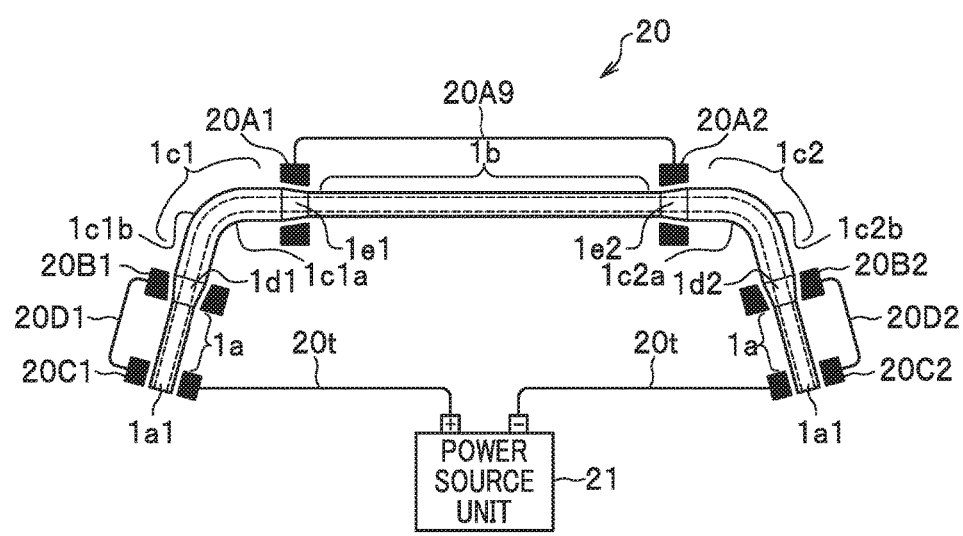
FIG. 6 is a schematic view illustrating a process of electrical heating for quenching the stabilizer.

FIG. 6 is a schematic view illustrating a process of electrical heating for quenching the hollow stabilizer.

Electrical heating for the hollow stabilizer 1 is performed using a heating apparatus 20.

An auxiliary electrode 20A1 clamps the diameter increasing portion 1e1 of the hollow stabilizer 1, and an auxiliary electrode 20A2 clamps a diameter increasing portion 1e2 of the hollow stabilizer 1. Note that the diameter increasing portion 1e2 of the hollow stabilizer 1 is a diameter increasing portion formed symmetrically to the diameter increasing portion 1e1 (see FIGS. 2A, 2B and 2C) of the hollow stabilizer 1. A short-circuiting wire 20A9 is connected between the auxiliary electrodes 20A1 and 20A2.

An auxiliary electrode 20B1 clamps the diameter increasing portion 1d1 of the hollow stabilizer 1, and an auxiliary electrode 20B2 clamps a diameter increasing portion 1d2 of the hollow stabilizer 1. Note that the diameter increasing portion 1d2 of the hollow stabilizer 1 is a diameter increasing portion formed symmetrically to the diameter increasing portion 1d1 of the hollow stabilizer 1.

In addition, entire heating electrodes 20C1, 20C2 clamp the ends 1a1 of the right and left arm portions 1a of the hollow stabilizer 1. Note that current-carrying wires 20t are connected from a power source unit 21 to the entire heating electrodes 20C1, 20C2.

A short-circuiting wire 20D1 is connected between the entire heating electrode 20C1 and the auxiliary electrode 20B1. In addition, a short-circuiting wire 20D2 is connected between the entire heating electrode 20C2 and the auxiliary electrode 20B2.

First, electricity is turned on between the entire heating electrodes 20C1 and 20C2 via the current-carrying wires 20t.

In this case, a portion of the hollow stabilizer 1 between the entire heating electrode 20C1 and the auxiliary electrode 20B1 is not heated because current flows through the short-circuiting wire 20D1. In addition, a portion of the hollow stabilizer 1 between the auxiliary electrode 20A1 and 20A2 is not heated because current flows through the short-circuiting wire 20A9. Moreover, a portion of the hollow stabilizer 1 between the entire heating electrode 20C2 and the auxiliary electrode 20B2 is not heated because current flows through the short-circuiting wire 20D2.

Since current flows through the curved portion 1c1 between the auxiliary electrode 20A1 and 20B1, and the curved portion 1c2 between the auxiliary electrode 20A2 and 20B2, both portions are heated. Note that the curved portion 1c2 is a curved portion formed symmetrically to the curved portion 1c1 illustrated in FIGS. 2A, 2B and 2C.

Then, when the temperature of the curved portions 1c1 and 1c2 reaches a predetermined temperature, the auxiliary electrodes 20A1, 20A2, 20B1, 20B2 are released from the diameter increasing portions 1e1, 1e2, 1d1, 1d2. After that, electricity is turned on between the entire heating electrode 201 and 20C2 to heat the entire hollow stabilizer 1.

In this way, because electrical heating is used for quenching, the thin portions at the bend outer sides of the bent portions of the curved portions 1c (1c1, 1c2) are heated to a higher temperature than the thick portions at the bend inner sides of the bent portions, as described above.

If these portions in this state are rapidly cooled down at the same time, for example, in water quenching, the strength and the hardness of the bend outer sides of the bent portions become higher than those of the bend inner sides (see FIGS. 3 and 4).

<Nature of Quenching Using Electrical Heating>

As described earlier, referring to FIG. 3, since the temperature of the thin portion of the outer side (the outer side of the bent portion) of the curved portions 1c (1d, 1c2) becomes higher than the thick portion of the inner side (the inner side of the bent portion), the cooling speed of the thin portions is higher than that of the thick portions. For example, assume that the point "b" indicates a thick portion of a bend inner side of a bent portion, and the point "a" indicates a thin portion of the bend outer side. Accordingly, since the tensile strength of the thin portion at the bend outer side of the bent portion is larger by the difference between the points "a" and "b", even though the bend outer sides of the curved portions 1c (1c1, 1c2) are made thinner than the bend inner sides, the tensile strength can be made at the same level.

In addition, if the hardness of the bend outer sides of the curved portions 1c (1c1, 1c2) becomes higher, the fatigue durability is also improved as illustrated in FIG. 4.

For example, referring to FIG. 4, since the temperature of the thin portions at the bend outer sides of the curved portions 1c (1d, 1c2) becomes higher than the temperature of the thick portions at the bend inner side, the hardness of the thin portions is higher than that of the thick portions. So, for example, assume that the point "d" indicates a thick portion at a bend inner side of a bent portion, and the point "e" indicates a thin portion at the bend outer side. Accordingly, since the hardness of the thin portion at the bend outer side is larger by "f", which is the difference between the point "e" and the point "d", even though the bend outer sides of the curved portions 1c (1c1, 1c2) are made thinner than the bend inner sides, the fatigue limit is made at the same level.

As described above, by utilizing the nature of electrical heating when there is a difference in thickness, the fatigue durability (fatigue limit) and the tensile strength (allowable stress) at the bend inner sides and the bend outer sides of the curved portions 1c (1c1, 1c2) is made at the same level or can be brought closer to the same level.

<Setting Thickness of Curved Portion 1c>
<Setting Thickness of Curved Portion 1c such that Fatigue Limit and Tensile Strength of Outer Side of Curved Portion 1c is Equal to Allowable Value (Within Allowable Range)>

Next, referring to the relations illustrated in FIGS. 3 and 4, descriptions are provided for a method of deciding the necessary thickness of the curved portion 1c that receives a high stress (details will be described later using FIGS. 9, 10A, 10B, and 10C) such that the stress of the outer side of the curved portion 1c is equal to the allowable value (the allowable range) of the fatigue limit (durability), and the tensile strength of the outer side is equal to the allowable value (within the allowable stress range).

Figure 7:
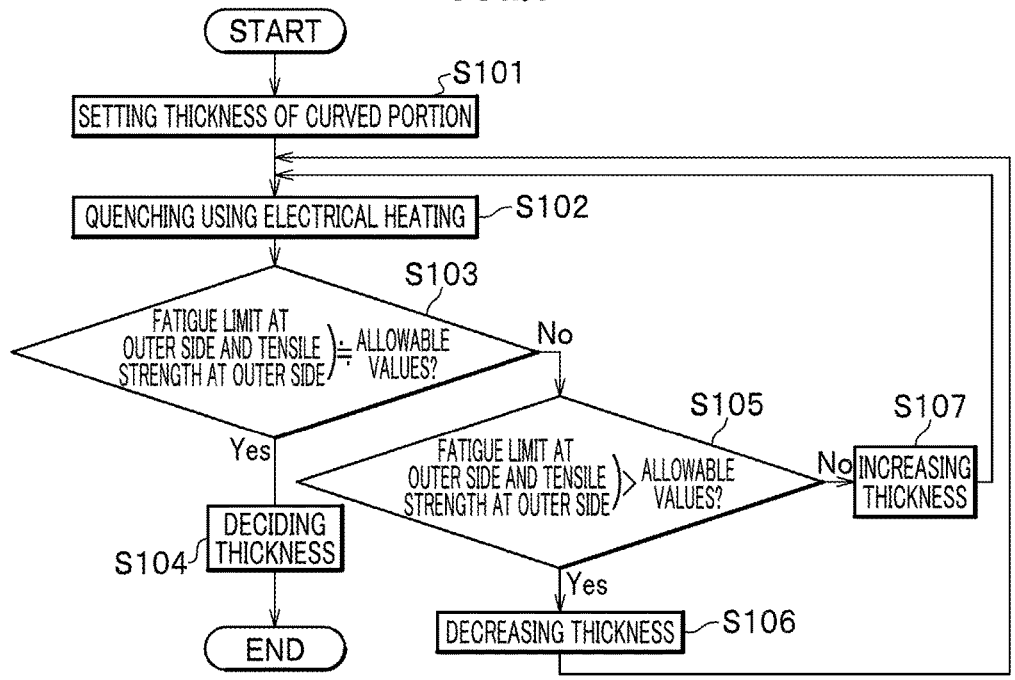
FIG. 7 is a diagram illustrating a method of setting the thickness of a curved portion such that the fatigue limit and the tensile strength of the outer side of the curved portion are equal to the allowable values (within the allowable ranges).

FIG. 7 is a diagram illustrating a method of setting the thickness of a curved portion such that the fatigue limit and the tensile strength of the outer side of the curved portion are equal to the allowable values (within the allowable ranges).

The curved portion 1c has a predetermined outer diameter. First, the thickness of the curved portion 1c is temporarily set (S101 in FIG. 7).

Then, quenching is performed using electrical heating described above (S102).

Next, the fatigue limit and the tensile strength at the outer side of the curved portion 1c are measured in a fatigue test and the like, and it is determined whether or not the fatigue limit and the tensile strength at the outer side are almost equal to the allowable values (within the allowable ranges of the fatigue limit and the allowable stress) (S103).

In the case where it is determined that the fatigue limit and the tensile strength at the outer side of the curved portion 1c are almost equal to the allowable values (within the allowable ranges of the fatigue limit and the allowable stress) (Yes at S103), the thickness of the curved portion 1c is decided (S104) and the process ends.

On the other hand, in the case where it is determined that the fatigue limit and the tensile strength at the outer side of the curved portion 1c are not almost equal to the allowable values (within the allowable ranges of the fatigue limit and the allowable stress) (No at S103), it is determined whether or not the fatigue limit and the tensile strength at the outer side of the curved portion 1c are almost larger than the allowable values (the allowable ranges of the fatigue limit and the allowable stress) (S105).

In the case where the fatigue limit and the tensile strength at the outer side of the curved portion 1c are larger than the allowable values (the allowable ranges of the fatigue limit and the allowable stress) (Yes at S105), the thickness of the curved portion 1c is set smaller (S106), and the process proceeds to the quenching of S102.

On the other hand, in the case where the fatigue limit and the tensile strength at the outer side of the curved portion 1c are smaller than the allowable values (the allowable ranges of the fatigue limit and the allowable stress) (No at S105), the thickness of the curved portion 1c is set smaller (S107), and the process proceeds to the quenching at S102.

The above is the method of setting the fatigue limit and the tensile strength at the outer side of the curved portion 1c to the allowable values (within the allowable ranges of the fatigue limit and the allowable stress).

Using this method, the thickness of the curved portion 1c is set such that the fatigue limit and the tensile strength at the outer side of the curved portion 1c are almost equal to the allowable values (within the allowable ranges of the fatigue limit and the allowable stress).

Note that thickness in FIG. 7 is obtained in the same manner, changing the setting of the outer diameter.

Alternatively, by setting the thickness to the predetermined thickness and replacing the thickness in the procedure in FIG. 7 with the outer diameter, the outer diameter is obtained which enables the fatigue limit and the tensile strength to be almost equal to the allowable values (within the allowable ranges of the fatigue limit and the allowable stress).

<Setting Thickness of Curved Portion 1c such that Fatigue Limit and Tensile Strength of Inner Side of Curved Portion 1c is Equal to Allowable Value (Within Allowable Range)>

Next, descriptions are provided for a method of deciding the necessary thickness of the curved portion 1c that receives a high stress such that the stress of the inner side of the curved portion 1c is equal to the fatigue limit and the tensile strength of the inner side is equal to the allowable value (the allowable ranges of the fatigue limit and the allowable stress).

Figure 8:
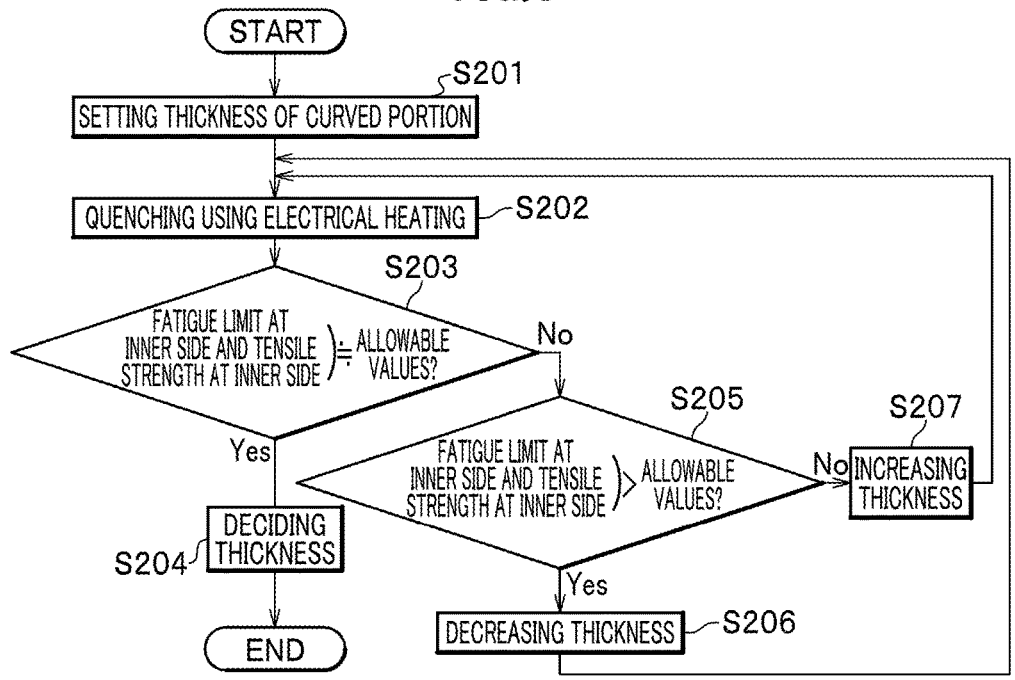
FIG. 8 is a diagram illustrating a method of setting the thickness of the curved portion such that the fatigue limit and the tensile strength of the inner side of the curved portion are equal to the allowable values (within the allowable ranges).

FIG. 8 is a diagram illustrating a method of setting the thickness of a curved portion such that the fatigue limit and the tensile strength of the inner side of the curved portion are equal to the allowable values.

The curved portion 1c has a predetermined outer diameter.

First, the thickness of the curved portion 1c is temporarily set (S201 in FIG. 8).

Then, quenching is performed using electrical heating described above (S202).

Next, the fatigue limit and the tensile strength at the inner side of the curved portion 1c are measured in the fatigue test and the like, and it is determined whether or not the fatigue limit and the tensile strength are almost equal to the allowable values (within the ranges of the fatigue limit and the allowable stress) (S203).

In the case where it is determined that the fatigue limit and the tensile strength at the inner side of the curved portion 1c are almost equal to the allowable values (within the allowable ranges of the fatigue limit and the allowable stress) (Yes at S203), the thickness of the curved portion 1c is decided (S204) and the process ends.

On the other hand, in the case where it is determined that the fatigue limit and the tensile strength at the inner side of the curved portion 1c are not almost equal to the allowable values (within the allowable ranges of the fatigue limit and the allowable stress) (No at S203), it is determined whether or not the fatigue limit and the tensile strength at the inner side of the curved portion 1c are larger than the allowable values (the allowable ranges of the fatigue limit and the allowable stress) (S205).

In the case where the fatigue limit and the tensile strength at the inner side of the curved portion 1c are larger than the allowable values (Yes at S205), the thickness of the curved portion 1c is set smaller (S206), and the process proceeds to the quenching of S202.

On the other hand, in the case where the fatigue limit and the tensile strength at the outer side of the curved portion 1c are smaller than the allowable values (No at S205), the thickness of the curved portion 1c is set smaller (S207), and the process proceeds to the quenching at S202.

The above is the method of setting the thickness such that the fatigue limit and the tensile strength at the inner side of the curved portion 1c are almost equal to the allowable values (within the allowable ranges of the fatigue limit and the allowable stress).

Using this method, it is possible to set the thickness of the curved portion 1c such that the fatigue limit and the tensile strength at the inner side of the curved portion 1c are almost equal to the allowable values (within the allowable ranges of the fatigue limit and the allowable stress).

Note that thickness in FIG. 8 is obtained in the same manner, changing the setting of the outer diameter.

Alternatively, by setting the thickness to the predetermined thickness and replacing the thickness in the procedure in FIG. 8 with the outer diameter, the outer diameter is obtained which enables the fatigue limit and the tensile strength to be almost equal to the allowable values (within the allowable ranges).

Note that after the setting is made such that the fatigue limit and the tensile strength at the outer side of the curved portion 1c in FIG. 7 are almost equal to the allowable values (within the allowable ranges of the fatigue limit and the allowable stress), the thickness and the outer diameter at the inner side of the curved portion 1c may be obtained referring to the relations on the tensile strength and the fatigue limit in FIGS. 3 and 4.

Alternatively, after the setting is made such that the fatigue limit and the tensile strength at the inner side of the curved portion 1c in FIG. 8 are almost equal to the allowable values (within the allowable ranges of the fatigue limit and the allowable stress), the thickness and the outer diameter at the the outer side of the curved portion 1c may be obtained referring to the relations on the tensile strength and the fatigue limit in FIGS. 3 and 4.

The above technique may be applied to set the thicknesses and the outer diameters at the bent points m1 to m5 of the bent portions illustrated in FIGS. 2A, 2B and 2C.

Referring to the relations on the tensile strength and the fatigue limit in FIGS. 3 and 4, the diameter is set using the procedures in FIGS. 7 and 8, and then the thickness is set such that the fatigue limit and the tensile strength are within the allowable ranges. Alternatively, after the thickness is set, the diameter is set such that the fatigue limit and the tensile strength are within the allowable ranges.

By repeating these as appropriate, it is possible to obtain a hollow stabilizer 1 in which the weight of the curved portion 1c is lightest.

Previously, when an entire hollow stabilizer 1 is designed to have equal durability, the design is made based on the outer side of the bent portion that receives a higher stress considering the difference in thickness between the bend inner and bend outer sides of the curved portion 1c. As a result, the bend inner side of the bent portion has a margin, and there is room for reducing the thickness in terms of the allowable stress.

Therefore, in the present embodiment, attention is directed to the fact that the lightest hollow stabilizer 1 in which the thickness varies can be achieved by adapting the allowable stresses at the inner sides and the outer sides of bent portions to the difference in thickness. In other words, the above object is achieved by making the allowable stress at the bend outer side of a bent portion larger than that at the bend inner side of the bent portion using the relations in FIGS. 3 and 4. The method to materialize this concept is quenching using electrical heating, the relations in FIGS. 3 and 4, the procedures in FIGS. 7 and 8, and the like.

<Overview of Bending Stress, Torsional Shearing Stress, and Principal Stress of Hollow Stabilizer 1>

Next, descriptions are provided for an overview of the bending stress, the torsional shearing stress, and the principal stress of the hollow stabilizer 1.

Figure 9:
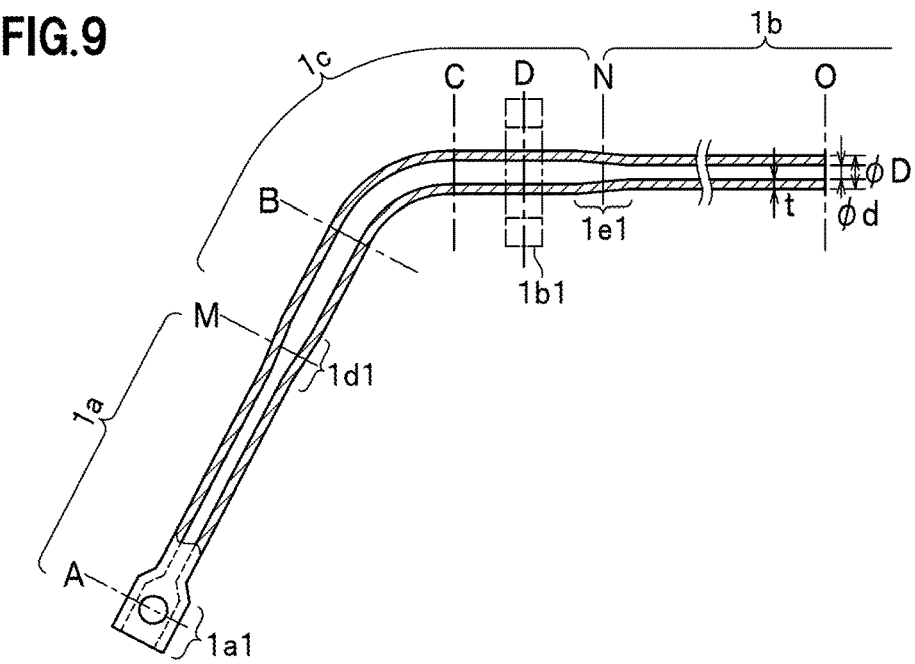
FIG. 9 is a schematic view illustrating the shape of the hollow stabilizer 1.

FIG. 9 is a schematic view illustrating the shape of the hollow stabilizer 1, and FIGS. 10A, 10B, and 10C are diagrams illustrating the bending stress, the shearing stress caused by torsion, and the maximum principal stress of the hollow stabilizer of FIG. 9, respectively.

In the hollow stabilizer 1 of FIG. 9, letters "A", "B", "C", and "D" are added to make clear the positional relation with FIGS. 10A, 10B, and 10C.

The letter "A" indicates the position of the connecting portion 1a1, the letters "B", and "C", the position of the curved portion 1c; and the letter "D", a supporting position of the rubber bush 1b1 (see FIG. 1).

A load from the wheel W is applied to the connecting portion 1a1 indicated by the letter "A". Accordingly, as illustrated in FIG. 10A, the bending stress gradually increases from the connection portion 1a1 indicated by the letter "A" to the curved portion 1c indicated by the letters "B" and "C" as the length of the arm of the bending moment increases, and then the bending stress decreases toward the center of the torsion bar portion 1b which is rotatably supported.

As illustrated in FIG. 10B, because the torsional force acts on the torsion bar portion 1b, the shearing stress caused by torsion is generated uniformly in the torsion bar portion 1b, and decreases as the distance from the torsion bar portion 1b increases.

As illustrated in FIG. 10C, because the load from the wheel W is applied to the connecting portion 1a1 indicated by the letter "A", the maximum principal stress gradually increases toward a portion of the curved portion 1c between the letter "B" and the letter "C" and decreases from the curved portion 1c toward the center of the torsion bar portion 1b.

Since the bending stress, the shearing stress caused by torsion, and the maximum principal stress generated in the hollow stabilizer 1 are expressed as described above, the outer diameter and the thickness of the hollow stabilizer 1 can be set referring to these values and conducting the fatigue test and the like such that the tensile strength and the fatigue limit are within the allowable ranges.

Note that it is preferable that the outer diameter and the thickness of the hollow stabilizer 1 be set to achieve the lightest weight.

Specifically, by creating a software program to obtain the outer diameter and the thickness that makes the weight of the hollow stabilizer 1 lightest under the condition that the outer diameter and the thickness are set such that the tensile strength and the fatigue limit are within the allowable ranges, it is possible to obtain the outer diameter and the thickness that achieves the lightest weight through repeated computations.

In this case, with the software program using the condition that the durability (within the fatigue limit range) of the entire region is almost uniform, the outer diameter, the thickness, and the inner diameter (outer diameter−thickness×2) of the hollow stabilizer 1 can be obtained to achieve the lightest hollow stabilizer 1 through repeated computations, based on test data obtained by the fatigue test and the like.

Alternatively, with a software program under the condition that the entire region of the hollow stabilizer 1 has the allowable stress values (within the allowable stress range), the outer diameter, the thickness, and the inner diameter (outer diameter−thickness×2) of the hollow stabilizer 1 is obtained to achieve the lightest hollow stabilizer 1 through repeated computations, based on test data obtained by the fatigue test and the like.

Or alternatively, with a software program under the condition that the durability (within the fatigue limit range) of the entire region of the hollow stabilizer 1 is almost the same and that the entire region has the allowable stress values (within the allowable stress range), the outer diameter, the thickness, and the inner diameter (outer diameter−thickness×2) can be obtained to achieve the lightest hollow stabilizer 1 through repeated computations, based on test data obtained by the fatigue test and the like.

Accordingly, the weight can be reduced to the limit of keeping the durability of the inner and the outer sides of the all bent portions of the hollow stabilizer 1 with varied thickness based on the allowable stress (allowable stress range), and the lightest hollow stabilizer 1 with varied thickness can be obtained which does not have any extra thickness.

In other words, by optimizing the allowable stress value (allowable stress range) and the durability (fatigue limit) at each portion, the lightest hollow stabilizer 1 is achieved.

Other Embodiments

1. Note that the way of obtaining the outer diameter, the thickness, and the inner diameter of the hollow stabilizer 1 in the embodiment described above is an example, and other methods may be used.

2. Note that the above framework can be applied to reduce the weight of a hollow stabilizer with a uniform thickness.

3. In addition, the framework of the above embodiment may also be applied in the same manner to reduce the weight of a hollow stabilizer that does not have many bent portions except the two curved portions illustrated in FIG. 9.

4. As has been described above, although the various constituents of the framework have been described, part of the framework may be employed, or some of the various constituents may be selected and combined as appropriate. Moreover, the present invention is not limited to the above embodiments, and modifications of the design can be made as appropriate without departing from the gist of the invention.

REFERENCE SIGNS LIST 1 hollow stabilizer
1c, 1c1, 1c2 curved portion (bent portion)
m1 to m5 bent point (bent portion)
D outer diameter
t thickness

The invention claimed is:

1. A hollow stabilizer, comprising:
a torsion bar portion extending longitudinally;
an arm portion extending transversely to the torsion bar portion; and a curved portion extending between the arm portion and the torsion bar portion, the curved portion having an inner wall and an outer wall in a radial direction of a curvature of the curved portion,
wherein with a thickness of the inner wall of the curved portion being larger than a thickness of the outer wall of the curved portion, a hardness of the outer wall of the curved portion is made higher than a hardness of the inner wall of the curved portion.

2. The hollow stabilizer according to claim 1, wherein a range of a durability of an entire region of the hollow stabilizer is made equal to a desired range such that a weight of the hollow stabilizer is lightest.

3. The hollow stabilizer according to claim 1, wherein outer diameters and the thicknesses throughout the hollow stabilizer are set such that stress of an entire area of the hollow stabilizer is within a range of allowable stresses and a weight of the hollow stabilizer is lightest.

* * * * *